Patented June 2, 1953

2,640,856

UNITED STATES PATENT OFFICE 2,640,856

PRODUCTION OF HEXAHYDROLUPULON AND THE SALTS THEREOF

John F. Carson, Berkeley, Calif., assignor to the United States of America as represented by the Secretary of Agriculture No Drawing. Application February 21, 1950,
Serial No. 145,585

11 Claims. (Cl. 260—586)

(Granted under Title 35, U. S. Code (1952), sec. 266)

This application is made under the act of March 3, 1883, as amended by the act of April 30, 1928, and the invention herein described, if patented in any country, may be manufactured and used by or for the Government of the United States of America for governmental purposes throughout the world without the payment to me of any royalty thereon.

This invention relates to derivatives of the naturally occurring antibiotic, lupulon, and has among its objects the production of the derivative hexahydrolupulon and the salts thereof.

Lupulon is a biologically active compound and is present in hops. Thus it can be isolated from the dried cones of the hop vine (*Lupulus humulus*) by an extraction procedure. Lupulon is antibiotically active against a wide variety of gram-positive organisms but suffers from the disadvantage that it is unstable in the presence of air, especially at temperatures of 20° C. or above. Thus crystals of lupulon will, in the presence of air at room temperature, become yellow and amorphous in a few days. For this reason, lupulon must be kept in containers under vacuum or under refrigeration in order to preserve its potency.

It has now been found that the compound hexahydrolupulon possesses even higher biological activity than does lupulon and in addition is stable on storage. Thus, for example, hexahydrolupulon is 6 to 8 times more active in vitro against *Streptococcus faecalis* and *Staphylococcus aureus* than is lupulon. Further, a sample of hexahydrolupulon has been exposed to air for 3 months at 20–26° C. with no change in chemical structure or biological activity whereas lupulon decomposes and loses its crystalline structure in less than a week under the same conditions. Consequently, the preservation of hexahydrolupulon requires no special precautions aside from protection from strong light.

In accordance with the process of this invention, hexahydrolupulon is prepared by catalytic hydrogenation of lupulon, 6 gram atoms of hydrogen being absorbed per mole of lupulon. The reaction involved can be represented by the following equation:

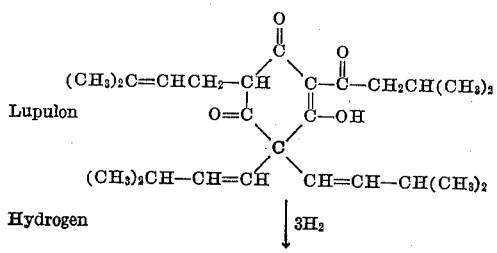

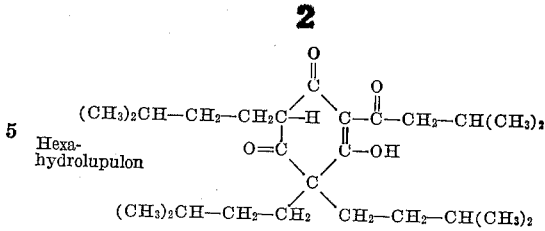

The hydrogenation process involves essentially contacting the lupulon with hydrogen in the presence of a catalyst—suitable catalysts being, for example, platinum, palladium, platinum oxide, and palladium oxide. Generally these catalysts are employed in a finely-ground form so as to present an extended surface to the reactants and if desired the catalysts may be supported on a carrier such as pumice, silica gel, charcoal, and so forth. Platinum oxide or palladium supported on active charcoal is preferred. To improve contact between the hydrogen and the lupulon, I prefer to employ an inert, liquid diluent as for example, methanol, ethanol, propanol, or the like. The temperature of reaction may be varied from about 10° C. to about 40° C. Usually, for convenience and for optimal results, the reaction is carried out at room temperature. The hydrogen is applied either at atmospheric pressure or to obtain faster reaction it may be applied under superatmospheric pressure, as for example, at 50 lbs./per sq. in. The time for reaction depends on such factors as the temperature, pressure of hydrogen and type and amount of catalyst. In most cases the reaction is complete in about 30 to about 90 minutes. Obviously, the proportion of hydrogen applied in the reaction should preferably be in excess of the theoretical proportions to ensure complete hydrogenation.

After the hydrogenation is completed, the reaction mixture is filtered to remove the catalyst and the solution concentrated under vacuum until hexahydrolupulon crystallizes out. The crystals are separated and recrystallized from a suitable solvent as for example, petroleum ether or methanol.

The following facts are relied on as evidence for the assigned structure of hexahydrolupulon:

1. In quantitative hydrogenation of lupulon in accordance with this invention, only 6 gram atoms of hydrogen per mole of lupulon are absorbed. In hydrogenation in the presence of palladium chloride as carried out by Wollmer, 8 atoms of hydrogen per mole of lupulon are absorbed. These facts are consistent with saturation of 3 double bonds in my process and saturation of 3 double bonds with simultaneous hydrogenolytic liberation of isopentane and aromatization of the ring in the Wollmer process.

2. The absorption spectrum of hexahydrolupulon in the ultraviolet shows the same general shape with maxima at the same wave lengths as lupulon. This shows that the double bonds reduced are all external to the ring and are not conjugated. Reduction of a carbonyl group or of a double bond in the ring would alter the absorption spectrum. Wollmer's phloroglucinol derivative obtained with palladium chloride shows a markedly different spectrum in the ultraviolet from that of lupulon, instead resembling that of other phloroglucinol derivatives.

3. Carbon-hydrogen analyses of my product are very close for the composition $C_{26}H_{44}O_4$ or hexahydrolupulon.

4. Neutralization equivalent. When the product of this invention is titrated with sodium hydroxide solution the neutralization equivalent of 419 is obtained (calc. for hexahydrolupulon 420). Lupulon itself has the neutralization equivalent of 414. Moreover the titration curves of lupulon and hexahydrolupulon are almost identical with the same acid strengths in 80% methanol. This also indicates that only exocyclic double bonds are affected. It has been found that any change in the ring structure of these compounds markedly changes the titration curve and therefore the relative acidity of the compound.

The following examples demonstrate the invention in greater detail. These examples are given only by way of illustration and not limitation.

*Example I*

753 mg. of lupulon was dissolved in 40 ml. of methanol and 25 mg. of finely-ground platinum oxide ($PtO_2$) was suspended in the solution. While shaking the mixture, 122.6 ml. (at standard temperature and pressure) of hydrogen was introduced therein—this quantity of hydrogen being equivalent to 6.02 gram atoms of hydrogen per mol of lupulon. The reaction mixture was filtered to remove the catalyst and the filtrate was concentrated under vacuum until crystals of hexahydrolupulon separated from solution. These crystals were separated and recrystallized from petroleum ether—a yield of 69% of hexahydrolupulon in the form of pure, colorless crystals was obtained.

*Example II*

Sixteen grams of lupulon was dissolved in 300 ml. of methanol and 4.2 grams of a palladium catalyst was suspended in the solution. This catalyst consisted of 5% elemental palladium supported on active charcoal. The mixture was placed in a hydrogenation bomb under a hydrogen pressure of 42 lbs. per sq. in. At the end of 1 hour, the pressure had dropped to 30 lbs. per sq. in. The pressure was released and the mixture was filtered to remove the catalyst. The filtrate was concentrated under vacuum to about 200 ml. After standing overnight the crystals of hexahydrolupulon were removed and recrystallized from petroleum ether. A yield of 73% of hexahydrolupulon was obtained in the form of pure, colorless crystals.

*Example III*

A sample of hexahydrolupulon obtained as set forth in Example II was dissolved in methanol and sufficient sodium hydroxide solution was added to make the reaction mixture neutral. The solution was then evaporated under vacuum thus to prepare the sodium salt of hexahydrolupulon.

Since hexahydrolupulon contains an enolic group

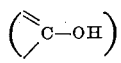

it exhibits acidic reactions and can be converted into its salts by reaction with suitable hydroxides, carbonates, or other inorganic compounds. For example, the sodium salt can be prepared by reacting hexahydrolupulon with sodium hydroxide. In the same manner, any desired salt can be prepared by the usual neutralization or metathetic techniques. Thus one can readily prepare the ammonium, potassium, calcium, barium, copper, lead, iron, nickel salts and so forth. Salt formation is not limited to inorganic salts as salts may also be made with organic bases as for example, methylamine, triethanol amine, glyceryl amine, aniline, morpholine, brucine, strychnine, pyridine, piperidine, tetraethyl ammonium hydroxide, dodecyl trimethyl ammonium hydroxide, triethyl sulphonium hydroxide, subtilin, proteins, and so forth.

Having thus described my invention, I claim:

1. A process for preparing hexahydrolupulon which comprises reacting lupulon at a temperature from about 10° C. to about 40° C. with an excess of hydrogen in the presence of a preformed catalyst added as such to the reactants, said catalyst being selected from the group consisting of platinum oxide and palladium supported on active charcoal, whereby 6 gram atoms of hydrogen are absorbed per mole of lupulon thus to produce hexahydrolupulon.

2. The process in accordance with claim 1 wherein the catalyst is platinum oxide.

3. The process in accordance with claim 1 wherein the catalyst is palladium supported on active charcoal.

4. The process in accordance with claim 1 wherein the reaction is carried out in the presence of an inert liquid diluent.

5. The process in accordance with claim 2 wherein the reaction is carried out in the presence of an inert liquid diluent.

6. The process in accordance with claim 3 wherein the reaction is carried out in the presence of an inert liquid diluent.

7. The process in accordance with claim 1 wherein the reaction is carried out in the presence of methanol as an inert, liquid diluent.

8. The process in accordance with claim 2 wherein the reaction is carried out in the presence of methanol as an inert, liquid diluent.

9. The process in accordance with claim 3 wherein the reaction is carried out in the presence of methanol as an inert, liquid diluent.

10. A compound selected from the group consisting of hexahydrolupulon and the salts thereof.

11. Hexahydrolupulon.

JOHN F. CARSON.

References Cited in the file of this patent

OTHER REFERENCES

Rideal and Taylor, "Catalysis in Theory and Practice," page 192, published by MacMillan and Co., London, 1919 edition.

Wollmer, Berichte, vol. 58, pages 672–678 (1925).